United States Patent
Sunaga et al.

(10) Patent No.: US 9,327,580 B2
(45) Date of Patent: May 3, 2016

(54) VEHICLE AIR-CONDITIONING SYSTEM

(75) Inventors: Hideki Sunaga, Saitama (JP); Masato Nomura, Saitama (JP); Masakazu Yamasaki, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 1074 days.

(21) Appl. No.: 13/144,332

(22) PCT Filed: Dec. 28, 2009

(86) PCT No.: PCT/JP2009/071766
§ 371 (c)(1),
(2), (4) Date: Jul. 13, 2011

(87) PCT Pub. No.: WO2010/082445
PCT Pub. Date: Jul. 22, 2010

(65) Prior Publication Data
US 2011/0271697 A1   Nov. 10, 2011

(30) Foreign Application Priority Data
Jan. 14, 2009   (JP) .................................. 2009-005923

(51) Int. Cl.
*B60H 1/00* (2006.01)
*G01J 1/02* (2006.01)
(Continued)

(52) U.S. Cl.
CPC ................. *B60H 1/0075* (2013.01); *G01J 1/02* (2013.01); *G01J 1/0252* (2013.01); *G01J 1/18* (2013.01); *G01J 2001/4266* (2013.01); *G01J 2005/068* (2013.01)

(58) Field of Classification Search
CPC ............. B60H 1/0075; B60H 1/00792; B60H 2001/0015; B60H 1/00642; B60H 1/00735
USPC ..................................................... 62/239, 126
See application file for complete search history.

(56) References Cited

U.S. PATENT DOCUMENTS 3,427,818 A * 2/1969 Erickson .......................... 62/140
4,448,035 A * 5/1984 Moriyama et al. ........... 62/176.6
(Continued)

FOREIGN PATENT DOCUMENTS

CN  1645071   7/2005
DE  103 12 077   8/2004
(Continued)

OTHER PUBLICATIONS

Supplementary European Search Report issued Sep. 25, 2012 in European Patent Application No. EP 09 83 8410.
(Continued)

*Primary Examiner* — Ljiljana Ciric
*Assistant Examiner* — Alexis Cox
(74) *Attorney, Agent, or Firm* — Wenderoth, Lind & Ponack, L.L.P.

(57) ABSTRACT

A vehicle air-conditioning system includes a solar radiation amount detection element configured to detect the amount of solar radiation incident on an instrument panel, a temperature correction element configured to correct a detection signal value output from the solar radiation amount detection element according to a temperature on the instrument panel, a solar radiation sensor configured to output a detection signal in which a temperature is corrected by the temperature correction element, and an air conditioner configured to control air conditioning inside a vehicle based on the detection signal from the solar radiation sensor.

7 Claims, 4 Drawing Sheets

(51) Int. Cl.
*G01J 1/18* (2006.01)
*G01J 1/42* (2006.01)
*G01J 5/06* (2006.01)

(56) References Cited

U.S. PATENT DOCUMENTS

| | | | |
|---|---|---|---|
| 5,209,079 A * | 5/1993 | Kajino et al. | 62/180 |
| 5,344,070 A * | 9/1994 | Akasaka et al. | 236/49.3 |
| 5,400,964 A * | 3/1995 | Freiberger | 236/91 C |
| 5,455,415 A * | 10/1995 | Yamada et al. | 250/214.1 |
| 5,582,021 A * | 12/1996 | Masauji | 62/126 |
| 5,678,761 A * | 10/1997 | Ikeda | 237/2 B |
| 5,729,989 A * | 3/1998 | Sunaga et al. | 62/126 |
| 6,966,498 B2 * | 11/2005 | Huang | B60H 1/0075 165/202 |
| 7,275,983 B2 * | 10/2007 | Aoki et al. | 454/75 |
| 2001/0000407 A1 * | 4/2001 | Ichishi et al. | 236/13 |
| 2002/0053601 A1 * | 5/2002 | Kamiya et al. | 236/49.3 |
| 2003/0066299 A1 * | 4/2003 | Aoki | 62/186 |
| 2003/0138131 A1 * | 7/2003 | Stam et al. | 382/104 |
| 2004/0151229 A1 | 8/2004 | Ruettiger | |
| 2004/0194479 A1 * | 10/2004 | Umebayashi et al. | 62/126 |
| 2005/0161581 A1 | 7/2005 | Michiyama et al. | |
| 2007/0076781 A1 | 4/2007 | Ruettiger | |
| 2007/0235549 A1 * | 10/2007 | Nakajima | 236/44 R |
| 2011/0284202 A1 * | 11/2011 | Hirai et al. | 165/287 |
| 2012/0198869 A1 * | 8/2012 | Morita et al. | 62/126 |

FOREIGN PATENT DOCUMENTS

| | | |
|---|---|---|
| DE | 10 2005 001 712 | 8/2005 |
| EP | 1 440 828 | 7/2004 |
| JP | 62-241723 | 10/1987 |
| JP | 63-159340 | 10/1988 |
| JP | 7-304319 | 11/1995 |
| JP | 2002-46446 | 2/2002 |
| JP | 2005-207889 | 8/2005 |

OTHER PUBLICATIONS

International Search Report issued Feb. 2, 2010 in International (PCT) Application No. PCT/JP2009/071766.

* cited by examiner

VEHICLE AIR-CONDITIONING SYSTEM

TECHNICAL FIELD

The present invention relates to a vehicle air-conditioning system having a solar radiation sensor which detects the amount of solar radiation entering a vehicle.

BACKGROUND ART

A vehicle air-conditioning system includes a plurality of sensors for conditioning air such as a vehicle interior temperature sensor which detects a temperature of a vehicle interior, a vehicle exterior temperature sensor which detects a temperature of a vehicle exterior (external air) and a solar radiation sensor which detects the amount of solar radiation entering a vehicle. The vehicle air-conditioning system is configured to calculate a target temperature, the blast volume or the like from the output of these sensors and a temperature value set by an operator (passenger), so as to blow out conditioned air inside a vehicle from a predetermined outlet (for example, refer to Patent Document 1).

By taking the amount of solar radiation entering a vehicle, which is detected by the solar radiation sensor, into consideration in the air-conditioning of the air-conditioning system as described above, more comfortable air-conditioning can be provided for a passenger in a vehicle.

PRIOR ART DOCUMENT

Patent Document

Patent Document 1: Japanese Patent Application Publication No. 2002-46446

DISCLOSURE OF THE INVENTION

Problem to be Solved by the Invention

The solar radiation sensor is disposed on an instrument panel in a vehicle, and outputs detected signals according to the amount of solar radiation entering a vehicle. A vehicle interior temperature sensor is generally disposed in an operation panel near a passenger.

If a vehicle (automobile) is parked outside on a clear summer day with a window closed, the temperature on the instrument panel becomes especially high in a vehicle due to the radiation heat generated by the solar radiation entering through the front windshield. If the air-conditioning of the air-conditioning system is performed together with the engine starting in this situation, although a passenger feels a high sensible temperature due to the radiation heat on the instrument panel, the vehicle interior temperature sensor detects the vehicle interior temperature near a passenger, and the air-conditioning is performed based on the detected temperature information. For this reason, comfortable cooling air may not be obtained at the beginning of the air-conditioning.

Alternatively, in a configuration which disposes a temperature sensor on the instrument panel in addition to the vehicle interior temperature sensor, the air-conditioning becomes complex and the costs are also increased.

It is therefore, an object of the present invention to provide a vehicle air-conditioning system which can easily perform appropriate air-conditioning by reflecting a temperature on an instrument panel to the air-conditioning without additionally disposing a temperature sensor on the instrument panel.

Means for Solving the Problem

In order to achieve the above object, a vehicle air-conditioning system according to the present invention includes a solar radiation amount detection element configured to detect the amount of solar radiation incident on an instrument panel, a temperature correction element configured to correct a detection signal value output from the solar radiation amount detection element according to a temperature on the instrument panel, a solar radiation sensor configured to output a detection signal in which a temperature is corrected by the temperature correction element, and an air conditioner configured to control air conditioning inside a vehicle based on the detection signal from the solar radiation sensor.

MODE FOR CARRYING OUT THE INVENTION

Figure 1:
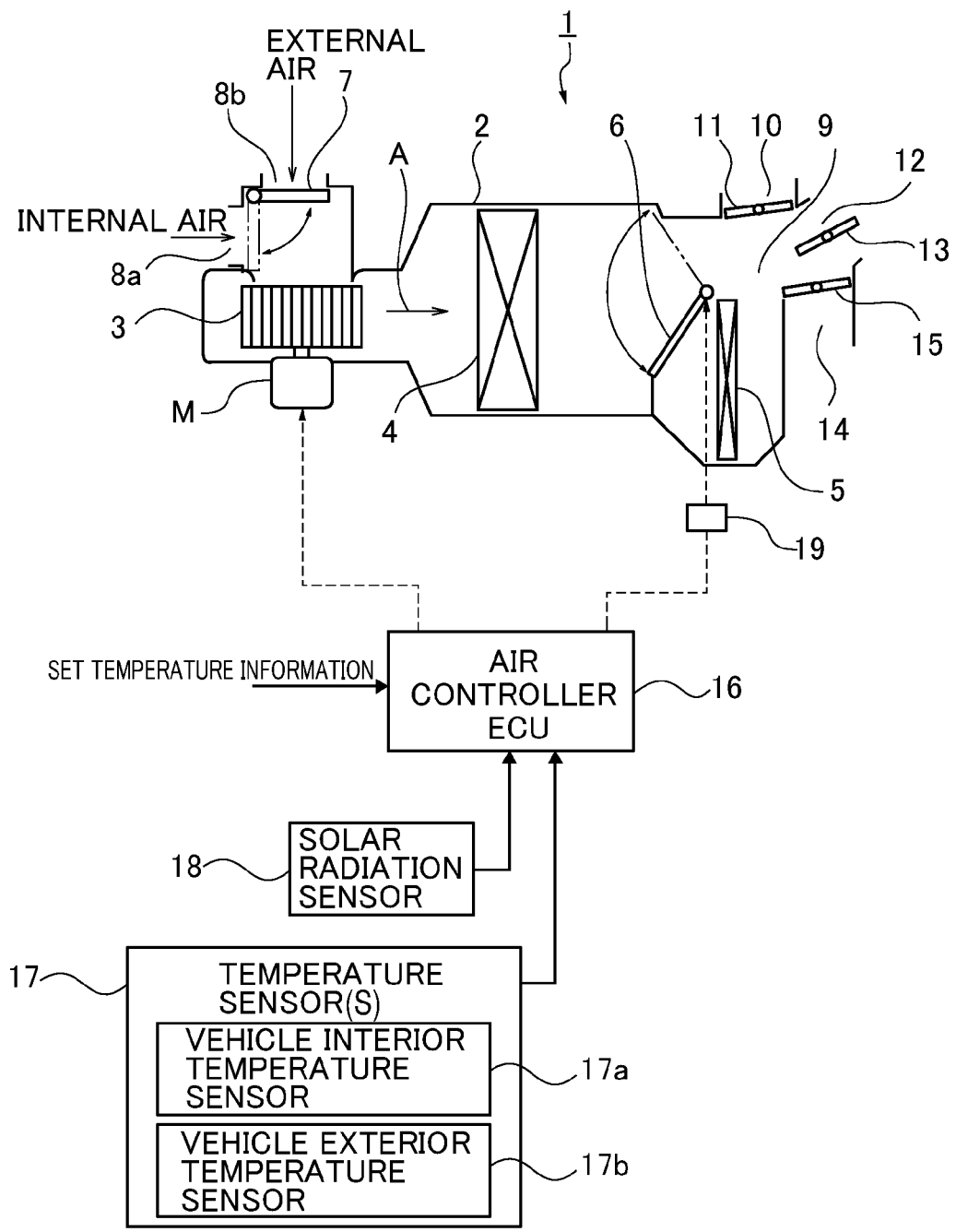
FIG. 1 is a schematic configuration view illustrating a vehicle air-conditioning system according to an embodiment of the present invention.

Hereinafter, an embodiment of the present invention will be described with reference to the drawings. FIG. 1 is a schematic configuration view illustrating a vehicle air-conditioning system according to the embodiment of the present invention.

As illustrated in FIG. 1, a vehicle air-conditioning system 1 according to the embodiment includes an air-conditioning case 2 provided in a not illustrated instrument panel of a vehicle interior front portion. The vehicle air-conditioning system 1 includes in a blower path formed in the air-conditioning case 2 a blower fan (blower) 3, a heat exchanger 4 (hereinafter, referred to as an evaporator) provided on the downstream side in the air flowing direction of the blower fan 3, a heater core 5 provided on the downstream side in the air flowing direction of the evaporator 4, and an air mix door 6 provided between the evaporator 4 and the heater core 5. The heater core 5 heats air passing through the heater core 5 with heated water (cooling water) which is circulated for driving an engine as a heat source.

The air-conditioning case 2 includes on the upstream side (left side in FIG. 1) in the air flowing direction an internal and external air switching door 7. Internal air or external air is introduced by selectively switching an internal air inlet 8a and an external air inlet 8b with the rotation of the internal and external air switching door 7. The air-conditioning case 2 also includes on the downstream side (right side in FIG. 1) in the air flowing direction a defroster door 11 which distributes air (conditioned air) in which a temperature is adjusted by an air mixing room 9 to a defroster outlet 10, a vent door 13 which distributes the conditioned air to a vent outlet 12 and a foot door 15 which distributes the conditioned air to a foot outlet 14.

The evaporator 4 constitutes a refrigerating cycle with a compressor which is driven by a not shown engine, a capacitor, a liquid tank, a circulation pipe and the like. The evaporator 4 performs heat exchange between air (internal air or external air) blowing on the evaporator 4 side by the rotation of the blower fan 3 and refrigerant circulating in a not shown refrigerant tube of the evaporator 4, so as to cool air passing through the evaporator 4. In FIG. 1, the arrow A is the air flowing direction.

An air conditioner ECU 16 of the vehicle air-conditioning system 1 loads sensor signals from each sensor such as a temperature sensor (vehicle exterior temperature sensor 17b, vehicle interior temperature sensor 17a or the like) 17 and an after-described solar radiation sensor 18 and temperature value information set in a an operation panel 21a by a passenger, and calculates air-conditioning signals such as a target temperature and the blast volume. The air conditioner 16 controls the rotation number of the blower fan 3 by controlling a fan motor M based on the calculated air-conditioning signals, and adjusts the opening of the air mix door 6 by controlling an air mix door controller 19.

A part of the cold air which has passed through the evaporator 4 is thereby guided on the heater core 5 side, so as to mix the cold air and the warm air obtained by the heater core 5 in an air mixing room 10, so that the air (cold air) in which the temperature is adjusted to a set temperature blows out from the vent outlet 12 by rotating the vent door 13 to an opening position, for example.

Figure 2:
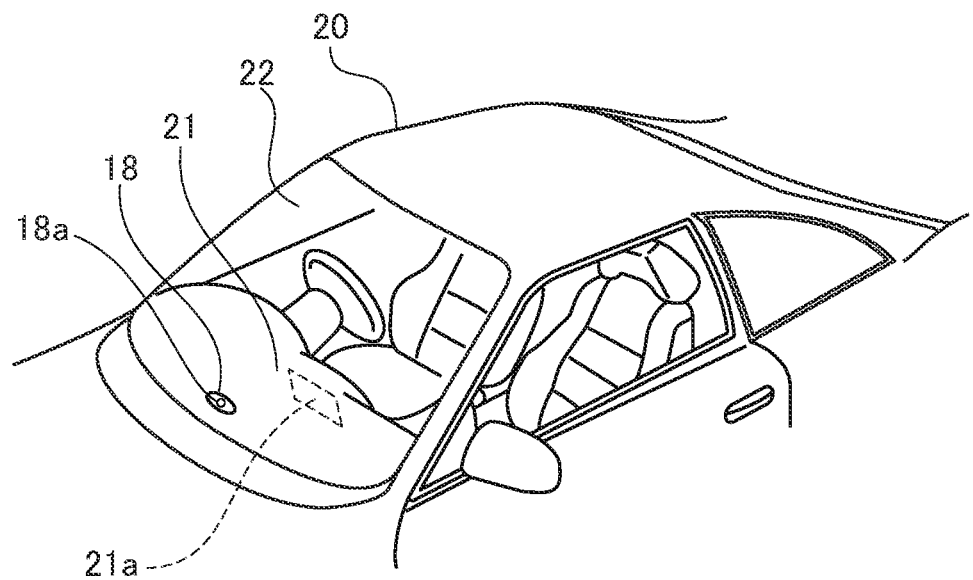
FIG. 2 is a view illustrating a solar radiation sensor disposed on an instrument panel.

The solar radiation sensor 18 is provided on an instrument panel 21 of a vehicle (automobile) 20 as illustrated in FIG. 2, and detects the amount of solar radiation entering the vehicle through a front windshield 22. The vehicle interior temperature sensor 17a is disposed in the operation panel 21a near a driver's seat.

Figure 3:
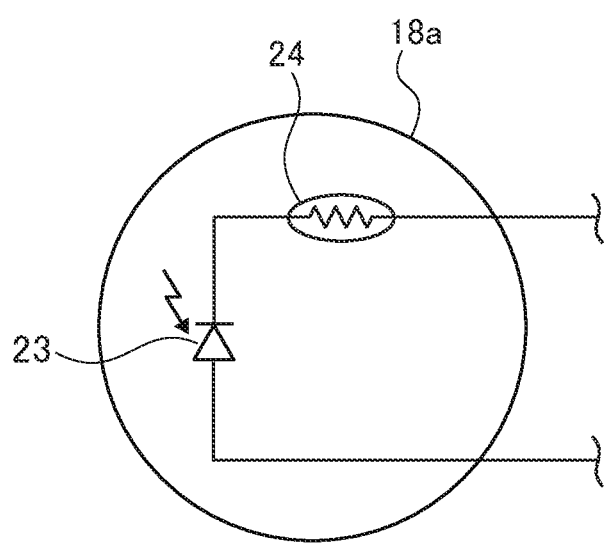
FIG. 3 is a view illustrating a sensor portion of the solar radiation sensor in the embodiment.

As illustrated in FIG. 3, a sensor portion 18a of the solar radiation sensor 18 includes a photodiode 23 as a solar radiation amount detection element which is connected in series and an NTC (Negative Temperature Coefficient) thermistor 24 as a temperature correction element. The photodiode 23 outputs current proportional to the received light volume. The NTC thermistor 24 is an element including a temperature feature in which a resistance value is lowered with the increase in temperature.

As described above, since the sensor portion 18a of the solar radiation sensor 18 includes the photodiode 23 connected in series and the NTC thermistor 24, if solar radiation light enters on the instrument panel 21 through the front windshield 22, and the temperature on the instrument panel 21 is increased, the resistance value is lowered by the temperature feature of the NTC thermistor 24, so that the current easily flows. The current value which is output from the sensor portion 18a thereby becomes higher than a value which is output from the sensor portion 18a including only the photodiode 23. If the amount of solar radiation entering the sensor portion 18a of the solar sensor 18 is increased, the temperature on the instrument panel 21 is increased according to the increase in the amount of solar radiation.

Figure 4:
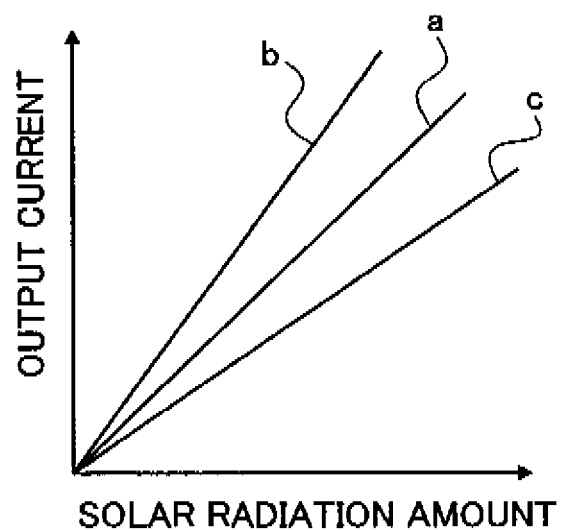
FIG. 4 is a view illustrating an output current feature of the sensor portion of the solar radiation sensor in the embodiment.

For example, as illustrated in FIG. 4, an output current feature of a illustrates a case in which the temperature on the instrument panel is approximately the same as the vehicle interior temperature (for example, 25° C.), an output current feature of b is a case in which the temperature on the instrument panel 21 is higher (for example, 60° C.) than the vehicle interior temperature by radiation heat in summer, and an output current feature of c illustrates a case in which the temperature on the instrument panel 21 is lower (for example, 5° C.) than the vehicle interior temperature by radiation heat release (cold radiation) in winter. In addition, the horizontal axis denotes the amount of solar radiation and the vertical axis denotes output current in FIG. 4.

As described above, the solar radiation sensor 18 can correct a temperature according to the temperature on the instrument panel 21 relative to the current which is output proportional to the amount of solar radiation detected by the photodiode 23. Accordingly, if the temperature on the instrument panel 21 is especially high due to the radiation heat when the vehicle 20 is parked outside on a clear summer day with a window closed, and the above described air-conditioning of the air-conditioning system is performed with the engine starting, the solar radiation sensor 18 outputs sensor output (for example, the output current feature of b in FIG. 4) according to the rising temperature on the instrument panel 21 to the air conditioner 16.

The air conditioner 16 controls the rotation number of the blower fan 3 by controlling the fan motor M, so as to blow out air (cold air) in which the temperature is lower than a temperature when the temperature is not corrected based on the sensor output from the input solar radiation sensor 18 (the sensor output in which the temperature is corrected according to the temperature on the instrument panel 21), and adjusts the opening of the air mix door 6 by controlling the air mix door driver 19.

Accordingly, the air conditioning which blows out air (cold air) in which the temperature is lower than a temperature when the temperature is not corrected according to the increase in the temperature on the instrument panel 21 can be performed without providing a temperature sensor in addition to the vehicle interior temperature sensor on the instrument panel 21. Therefore, a passenger who feels a high sensible temperature due to the radiation heat on the instrument panel 21 can feel comfortable coolness from the beginning of the air-conditioning.

If the temperature on the instrument panel 21 is lower than the vehicle interior temperature due to the radiation heat release (cold radiation) in winter, when the air-conditioning of the vehicle air-conditioning system is performed as described above with the engine starting, the solar radiation sensor 18 outputs the sensor output in which the temperature is corrected according to the low temperature on the instrument panel 21 to the air conditioner 16.

The air conditioner 16 controls the rotation number of the blower fan 3 by controlling the fan motor M, so as to blow out air (warm air) in which the blowing-out temperature is higher than a temperature when the temperature is not corrected based on the sensor output from the input solar radiation sensor 18 (the sensor output in which the temperature is corrected according to the temperature on the instrument panel 12), and adjusts the opening of the air mix door 6 by controlling the air mix door driver 19.

Accordingly, the air-conditioning which blows out air (warm air) in which the temperature is higher than a temperature when the temperature is not corrected according to the decrease in the temperature on the instrument panel 21 can be performed without providing a temperature sensor in addition to the vehicle interior temperature sensor on the instrument panel 21. Therefore, a passenger who feels a low sensible temperature due to the radiation heat release on the instrument panel 21 can feel comfortable warmth from the beginning of the air-conditioning.

According to the vehicle air-conditioning system 1 of the present embodiment, the solar radiation sensor 18 including in the sensor portion 18a the photodiode 23 and the NTC thermistor 24 is provided on the instrument panel 21, so that appropriate air-conditioning can be easily performed by reflecting the temperature on the instrument panel 21 to the air-conditioning without providing an instrument panel temperature sensor which detects the temperature on the instrument panel 21.

In the embodiment, the sensor portion 18a of the solar sensor 18 has a configuration in which the photodiode 23 and the NTC thermistor 24 are arranged in series, but the sensor configuration is not limited thereto. Sensor configurations illustrated in FIGS. 5A, 5B, 5C, for example, can obtain the sensor output in which the temperature is corrected in accordance with the temperature on the instrument panel 21.

Figure 5A:
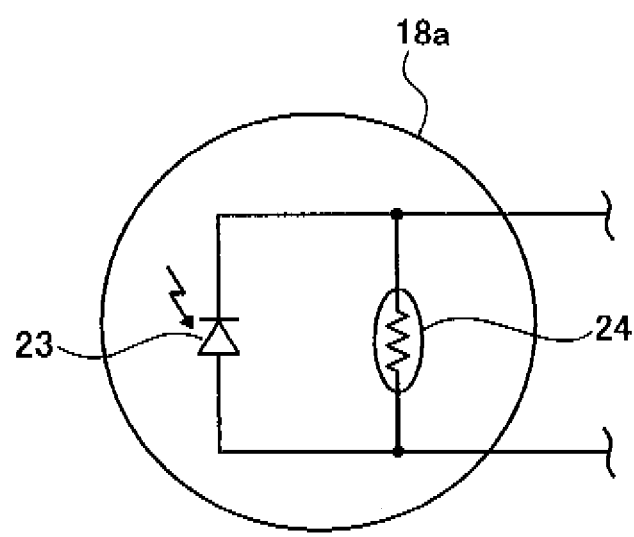
FIG. 5A is a view illustrating a modified example of the sensor portion of the solar radiation sensor in the embodiment.
Figure 5B:
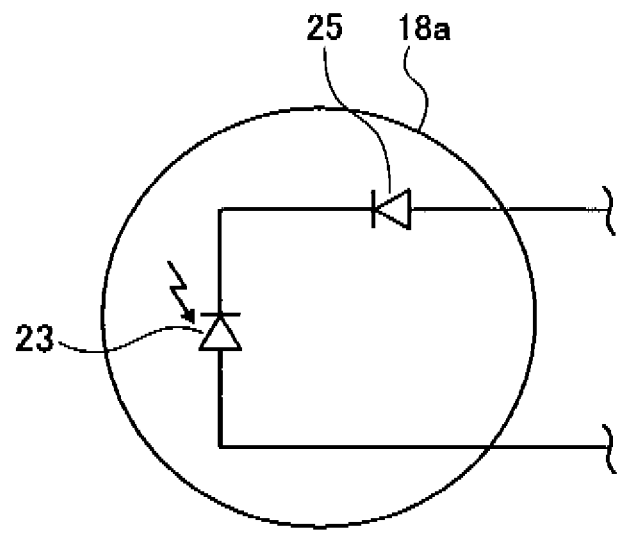
FIG. 5B is a view illustrating a modified example of the sensor portion of the solar radiation sensor in the embodiment.
Figure 5C:
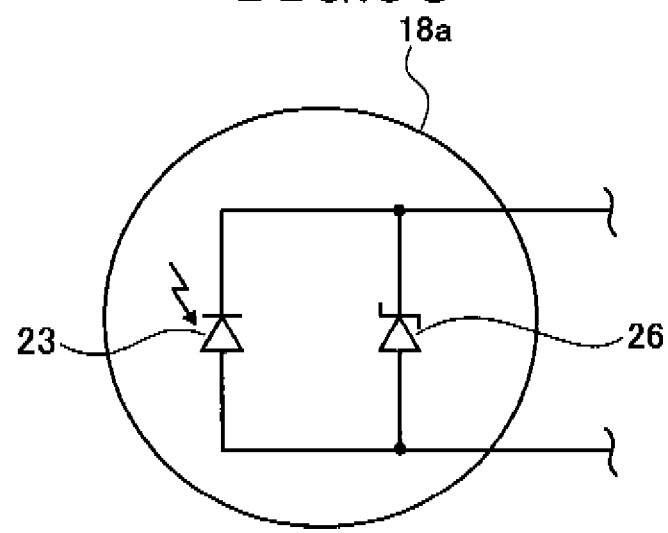
FIG. 5C is a view illustrating a modified example of the sensor portion of the solar radiation sensor in the embodiment.

The sensor portion 18a in FIG. 5A has a configuration in which the photodiode 23 and the NTC thermistor 24 are connected in parallel. Moreover, the sensor portion 18a in FIG. 5B has a configuration in which the photodiode 23 and a forward diode 25 are disposed in series. Furthermore, the sensor portion 18a in FIG. 5C has a configuration in which the photodiode 23 and a Zener diode 26 are arranged in parallel.

In the present embodiment, the configuration having one sensor portion 18a of the solar radiation sensor 18 is used, but a configuration having two sensor portions 18a in the solar radiation sensor 18 can be used. Moreover, a configuration in which a sensor portion having an automatic light function (a function which automatically turns on light when it gets dark) is integrally incorporated into the sensor portion 18a of the solar radiation sensor 18 can be used.

According to the vehicle air-conditioning system of the present invention, since the air conditioner performs the air-conditioning such that the temperature of the conditioned air blowing inside the vehicle is corrected based on the detection signal from the solar radiation sensor in which the temperature is corrected by the temperature correction element, the air controller can blow out air (cold air) in which the blowing out temperature is lower than a temperature when the temperature is not corrected according to the increase in the temperature on the instrument panel even if the temperature on the instrument panel becomes especially high due to the radiation heat. Therefore, a passenger who feels a high sensible temperature due to the radiation heat on the instrument panel 21 can feel comfortable coolness from the beginning of the air-conditioning.

Although the vehicle air-conditioning system of the present invention has been described above, the present invention is not limited thereto. It should be appreciated that variations may be made in the embodiments described by persons skilled in the art without departing from the scope of the present invention. The present application is based on the claims priority from Japanese Patent Application No. 2009-005923, filed on Jan. 14, 2009, the disclosure of which is hereby incorporated by reference in its entirety.

The invention claimed is:

1. An air-conditioning system provided to a vehicle, the vehicle including a windshield, an instrument panel, and an operation panel, the air-conditioning system comprising:
   an air conditioner;
   a solar radiation sensor positioned on the instrument panel of the vehicle, the solar radiation sensor including a solar radiation amount detection element and a thermistor; and
   a vehicle interior temperature sensor disposed in the operation panel to detect a vehicle interior temperature,
   wherein the solar radiation amount detection element is configured to detect an amount of solar radiation entering the vehicle, and output a detection signal based on the detected amount of solar radiation,
   wherein the thermistor is configured to correct the detection signal output from the solar radiation amount detection element according to a temperature of a space between the instrument panel and the windshield,
   wherein the solar radiation sensor is configured to output a corrected detection signal, the corrected detection signal being the detection signal corrected by the thermistor, and
   wherein the air conditioner is configured to control air conditioning inside the vehicle based on the vehicle interior temperature detected by the vehicle interior temperature sensor and the corrected detection signal output by the solar radiation sensor.

2. The air-conditioning system according to claim 1, wherein
   the solar radiation amount detection element includes a photodiode configured to output electric current proportional to the amount of solar radiation incident on the instrument panel,
   the thermistor has a temperature feature in which a resistance value of the thermistor is lowered with an increase in the temperature of the space between the instrument panel and the windshield, and
   the thermistor corrects an electric current value of the detection signal output from the photodiode by using the temperature feature.

3. The air-conditioning system according to claim 2, wherein the photodiode and the thermistor are connected in series.

4. The vehicle air-conditioning system according to claim 2, wherein the photodiode and the thermistor are connected in parallel.

5. The air conditioning system according to claim 1, wherein the solar radiation sensor includes a sensor portion having an automatic light function.

6. The air conditioning system according to claim 1, wherein
   the solar radiation sensor is provided on a top surface of the instrument panel of the vehicle.

7. A vehicle, comprising:
   an instrument panel;
   a windshield;
   an air-conditioning system; and
   an operation panel,
   wherein the air-conditioning system comprises:
   an air conditioner;
   a vehicle interior temperature sensor disposed in the operation panel to detect a vehicle interior temperature; and
   a solar radiation sensor positioned on the instrument panel of the vehicle, the solar radiation sensor including a solar radiation amount detection element and a thermistor,
   wherein the solar radiation amount detection element is configured to detect an amount of solar radiation entering the vehicle, and output a detection signal based on the detected amount of solar radiation,
   wherein the thermistor is configured to correct the detection signal output from the solar radiation amount detection element according to a temperature of a space between the instrument panel and the windshield,
   wherein the solar radiation sensor is configured to output a corrected detection signal, the corrected detection signal being the detection signal corrected by the thermistor, and wherein the air conditioner is configured to control air conditioning inside the vehicle based on the vehicle interior temperature detected by the vehicle interior temperature sensor and the corrected detection signal output by the solar radiation sensor.

* * * * *